June 26 1951     M. DOBROSKY     2,558,423
SPOKE ORNAMENT FOR BICYCLE WHEELS
Filed Sept. 8, 1948
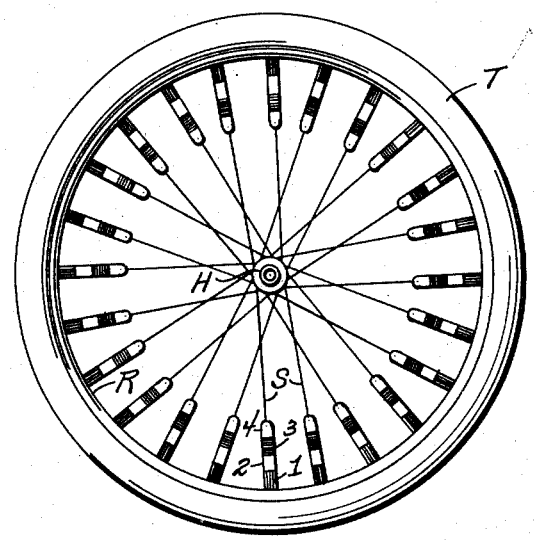
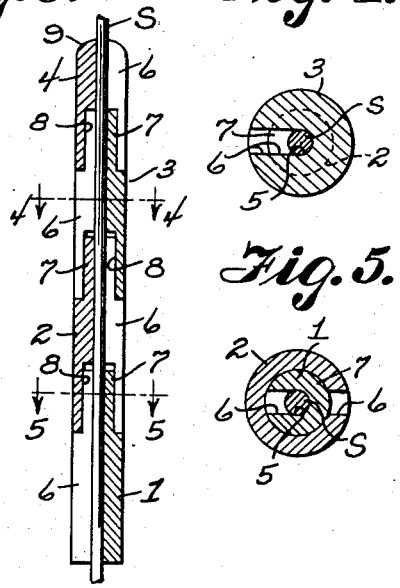
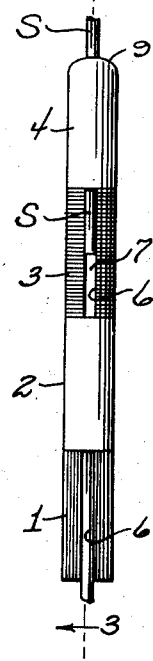
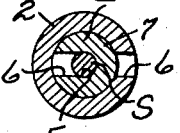
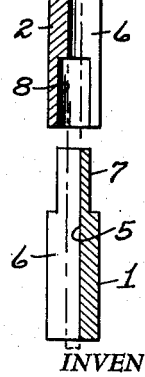
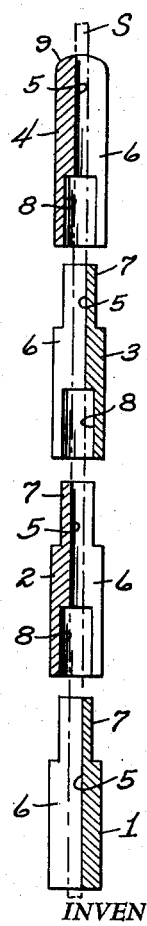
INVENTOR.
Michael Dobrosky
BY Victor J. Evans & Co.
ATTORNEYS Patented June 26, 1951

2,558,423

UNITED STATES PATENT OFFICE 2,558,423

SPOKE ORNAMENT FOR BICYCLE WHEELS

Michael Dobrosky, Flint, Mich.

Application September 8, 1948, Serial No. 48,212

1 Claim. (Cl. 41—34)

The present invention relates to the general class of ornamentation, or separable ornamental devices, and more specifically to spoke-ornaments for bicycle wheels that are especially adapted for attachment to the standard wire spokes of such wheels, and adapted equally as well for use on other revolving wheels of this type. The primary purpose of the invention is to equip the spokes of the wheel with plural or multiple-section ornaments having contrasting characteristics whereby when the wheel is revolving, and under centrifugal force, a concentric series of contrasting annular bands will be formed adjacent the rim of the wheel.

In this form of the invention the contrasting characteristics consist in the use of plural or multiple sections of varying colors which provide concentric annular bands of different colors, and while I have illustrated and described a four-section ornament of four different colors, it will be understood that this number may be increased or decreased, as desired, and colors other than those illustrated may be used.

In the physical embodiment of my invention a minimum number of parts are employed that may with facility be manufactured at low cost of production, and the parts may be assembled with convenience and manually installed on the spokes of a wheel with ease to insure a durable, novel, and attractive ornamental feature for the wheel or other revolving device.

The invention consists in certain novel combinations and arrangements of parts as will hereinafter be described and more particularly pointed out in the appended claim. In the accompanying drawings I have illustrated a complete example of a physical embodiment of my invention wherein the parts are combined and arranged in accord with one mode I have devised for the practical application of the principles of my invention. It will however be understood that changes and alterations are contemplated and may be made in these exemplifying drawings and mechanical structures, within the scope of my claim, without departing from the principles of the invention.

Figure 1 is a view in elevation of a standard type of bicycle wheel equipped with the ornaments of my invention.

Figure 2 is an enlarged view of one of the ornaments mounted on a wheel spoke; and Figure 3 is a sectional view at line 3—3 of Fig. 2.

Figures 4 and 5 are, respectively, enlarged transverse sectional views at lines 4—4 and 5—5 of Fig. 3.

Figure 6 is an exploded view showing the sections of the ornament.

In order that the general arrangement and utility of parts may readily be understood I have disclosed in Fig. 1 a standard type of bicycle wheel including the tire T, the rim R, the wire spokes S, and the central hub H, and as shown each of the spokes may be equipped with one of the unitary structures as an ornamental feature.

As indicated in Fig. 2 this specific ornament includes four sections, as a base section 1 colored red; intermediate sections 2 and 3 colored respectively white and blue; and the cap section 4 has a silver color; and these units are each mounted on a spoke with its base end adjacent the rim R and the cap end pointing toward the hub H.

In this initial outwardly spread position the units are frictionally held on their spokes, and this position is maintained, as the wheel revolves, under centrifugal force, to form four annular bands of red, white, blue, and silver.

The sections of the units may be fashioned of wood or other suitable material, and preferably the material is somewhat resilient to insure frictional clamping engagement between adjoining sections, and to insure frictional engagement of the ornamental unit with its spoke.

Each of the tubular sections is fashioned with a central longitudinal extending bore 5 that opens outwardly through a lateral longitudinal extending slot 6, by means of which the sections may be pushed over the spokes and mounted in place on the spokes.

The tubular base unit 1, and the intermediate units 2 and 3 are each fashioned with a reduced end or head 7 forming a nipple, and the intermediate units or sections 2 and 3, and the cap section 4 are each fashioned with bell ends or sockets or enlarged bores 8; while the cap section 4 is preferably finished with a rounded inner end or head 9.

In mounting the sections on the spoke, the base section is first applied to the spoke, then section 2 is applied to the spoke and its socket-end is forced down over the nipple or reduced head of the base section, to clamp these adjoining sections together and to clamp them on the spoke. Then this procedure is followed in mounting the intermediate section 3 and the cap section 4.

To lock the ornament as a whole on the spoke and thus prevent its displacement one of a pair of adjoining sections may be turned to the right or left, as indicated in Fig. 3, to locate the slots of these adjoining sections at diametrically opposite points, and this relationship of adjoining sections is maintained by the frictional engagement of the heads and sockets, and by the clamped engagement of the unit on the spoke.

Having thus fully described my invention, what I claim as new and desire to secure by Letters Patent is:

As an article of manufacture the combination with axially alined tubular substantially resilient sections, of an end section having a reduced head, a cap section having a socket end and intermediate sections each having a reduced head and a socket end, a longitudinal slot extending through each section and the head and socket thereon so that said sections can be applied to a wheel spoke, and each reduced head being frictionally engaged in each socket end to maintain said sections on said wheel spoke in fixed relation to each other.

MICHAEL DOBROSKY.

REFERENCES CITED

The following references are of record in the file of this patent:

UNITED STATES PATENTS

| Number | Name | Date |
| --- | --- | --- |
| 1,403,600 | Grand | Jan. 17, 1922 |
| 1,672,850 | Meier | June 5, 1928 |
| 1,750,851 | Meier | Mar. 18, 1930 |
| 1,898,696 | Sorensen | Feb. 21, 1933 |
| 1,950,082 | Farr | Mar. 6, 1934 |
| 2,269,670 | Kieckbusch | Jan. 13, 1942 |